United States Patent [19]

Grummett

[11] Patent Number: 4,480,541
[45] Date of Patent: Nov. 6, 1984

[54] CONTROL SYSTEM FOR DOT MATRIX LINE PRINTER

[75] Inventor: Lorne H. Grummett, Costa Mesa, Calif.

[73] Assignee: Trilog, Inc., Irvine, Calif.

[21] Appl. No.: 374,265

[22] Filed: May 3, 1982

[51] Int. Cl.³ .............................................. B41J 3/12
[52] U.S. Cl. ................................ 101/93.04; 400/121; 400/82; 101/93.11; 101/93.09
[58] Field of Search ............... 400/121, 124, 322, 328, 400/903, 82, 279; 101/93.04, 93.05, 93.09, 93.11; 364/900; 318/696

[56] References Cited

U.S. PATENT DOCUMENTS

| | | | |
|---|---|---|---|
| 4,159,882 | 7/1979 | Sanders et al. | 101/93.05 X |
| 4,278,359 | 7/1981 | Weikel | 400/121 |
| 4,279,199 | 7/1981 | Blanco et al. | 101/93.05 |
| 4,351,235 | 9/1982 | Bringhurst | 400/121 X |
| 4,377,847 | 3/1983 | Daniel et al. | 318/696 X |

Primary Examiner—Paul T. Sewell
Attorney, Agent, or Firm—Freilich, Hornbaker, Rosen & Fernandez

[57] ABSTRACT

A control system for a dot matrix line printer/plotter apparatus for producing hard copy printout of digitally represented data. The apparatus utilizes one or more hammer banks, each mounted for reciprocal linear movement across a paper web moving therepast. Each hammer bank carries N hammer assemblies, each of which can be selectively actuated to print a dot in any of D columns in any of C characters as the bank sweeps across the paper web. The control system includes an input/output (I/O) microprocessor and a print control microprocessor, each connected so as to have access to a common random access memory (RAM). A portion of the RAM is used as multiple line buffers. Each line buffer is used to store all the character bytes which define a character line to be printed. The I/O processor accepts externally supplied data and loads character bytes for each sequential character line into a different line buffer. During each hammer bank sweep, the print control processor operates with a mapper subsystem to access character bytes in the appropriate sequence from the line buffer storing the character line to be printed. For each of C×D dot positions during each sweep, N character bytes are sequentially processed to derive a dot data bit for each such byte. A timing circuit controlled by the print control processor supplies shuttle step and hammer actuate (fire) pulses to a shuttle stepper motor and the hammers, respectively.

7 Claims, 16 Drawing Figures

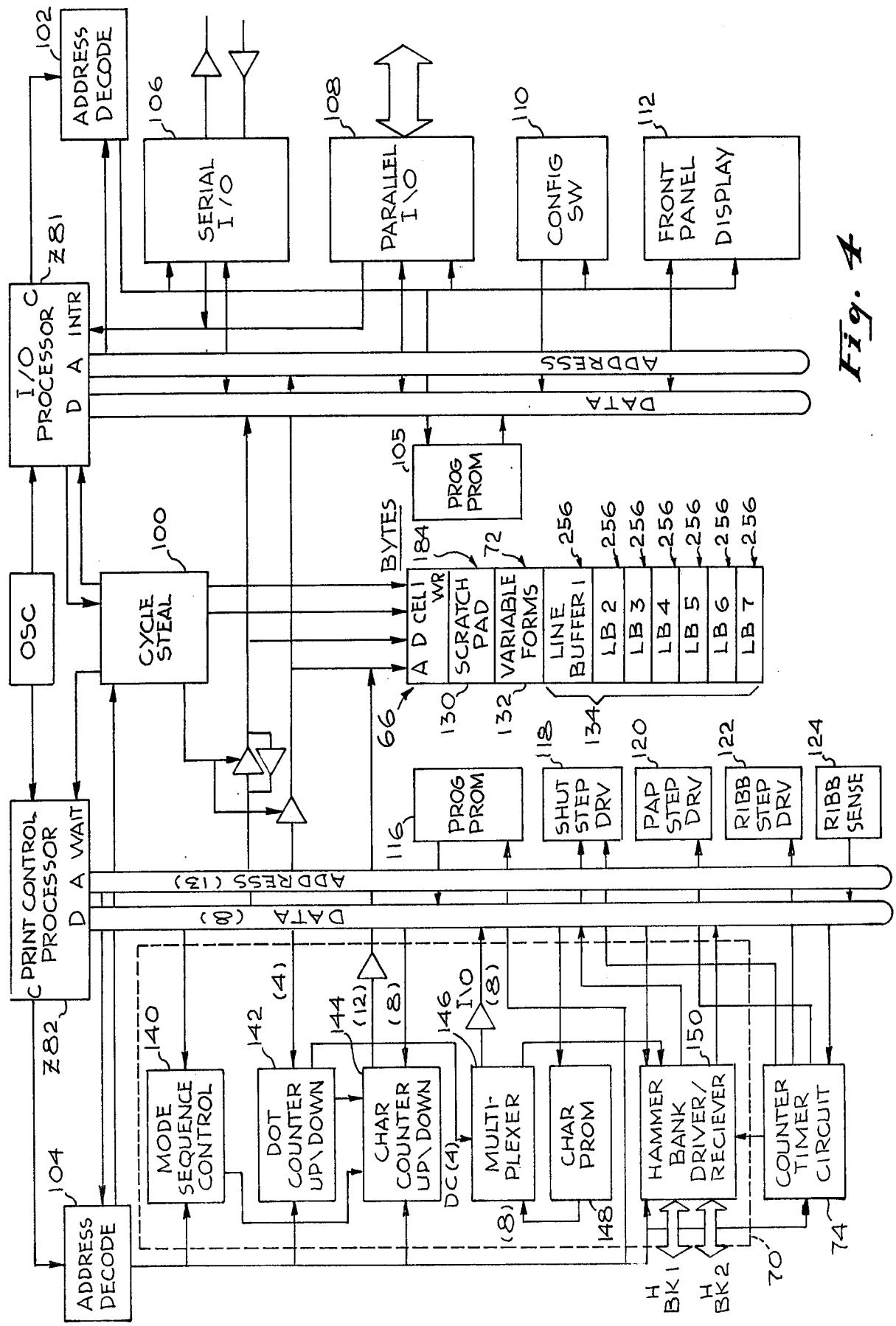

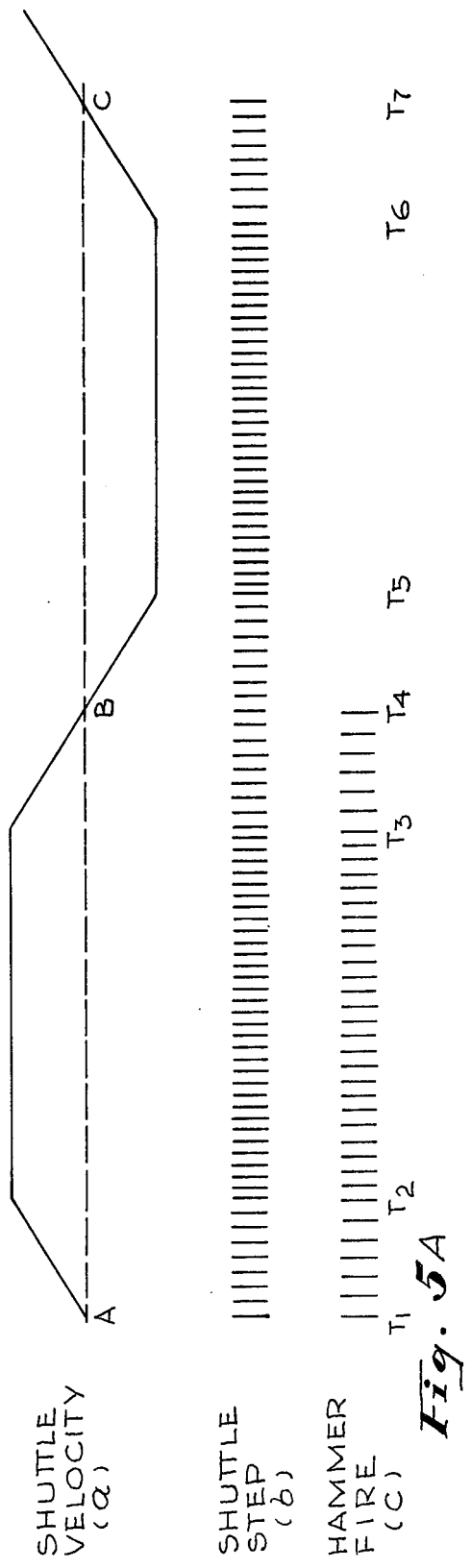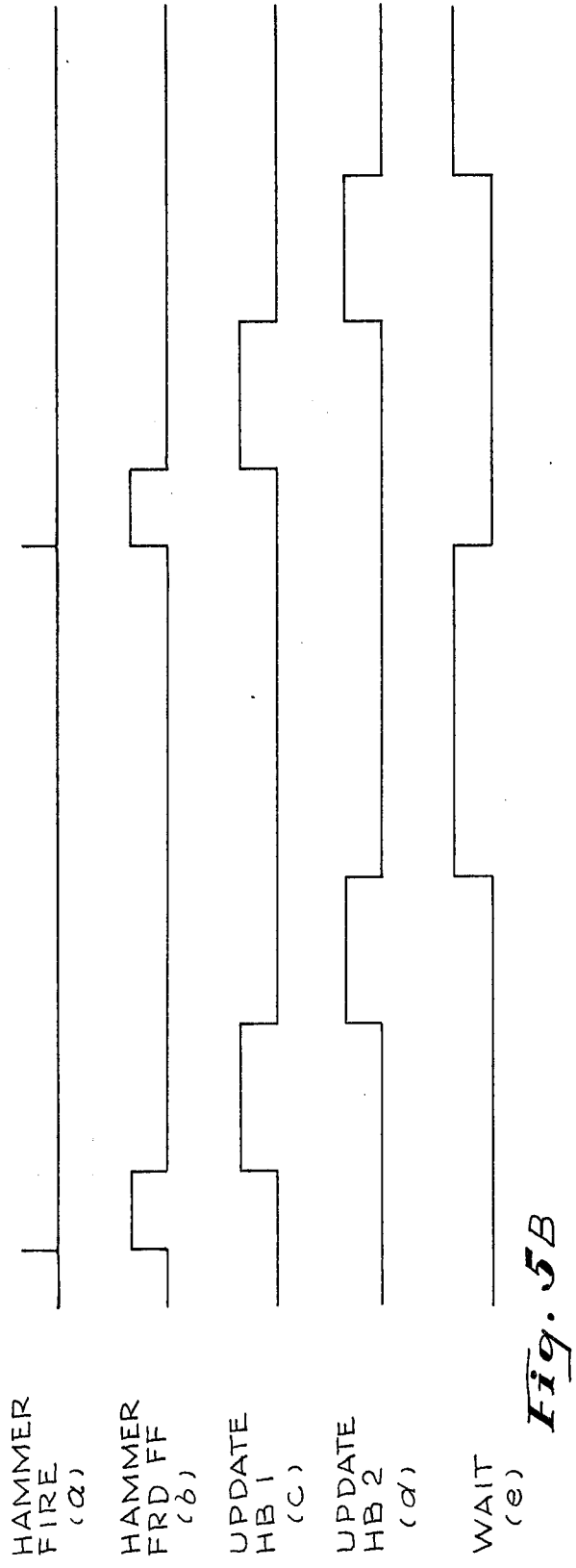

CONTROL SYSTEM FOR DOT MATRIX LINE PRINTER

BACKGROUND OF THE INVENTION

This invention relates generally to dot matrix printer/plotters suitable for producing permanent copy of digitally represented data.

Various devices are well known for producing hard copy printout of digitally represented data. One class of such devices prints fully formed characters, e.g. daisy wheel printers, whereas a different class of devices forms charaters by printing multiple closely spaced dots appropriately arranged within a matrix of dot positions. Although dot matrix impact printers utilizing hammers or wires to strike a paper or ribbon are most widely used, nonimpact dot matrix printers employing other dot print elements, e.g. ink jet, are also well known.

Within the broad class of dot matrix printers, two different categories are readily commercially available; i.e. (1) serial and (2) line. Both categories of dot matrix printers have been widely discussed in the literature; e.g. see Mini-Micro Systems, January 1981, pages 60 and 97.

The dot matrix serial printer is characterized by the use of a print head, typically having nine vertically spaced wires, mounted to move horizontally back and forth across a paper web mounted for vertical movement. As the head moves across the paper, head solenoids are selectively actuated to impact the wires against the paper to print successive dot columns and thus, serially form characters, each typically within a matrix of nine dot positions high and nine dot positions wide. The paper is stepped after each line of characters is printed.

The dot matrix line printer differs from the serial printer in that a row of dots, rather than a line of characters, is printed between successive paper steps. As is described on page 70 of the aforementioned Mini-Micro Systems publication, a typical commercially available dot matrix line printer utilizes a bank of 44 hammers mounted on a shuttle which sweeps each hammer across three character positions over a 0.3 inch movement. As the shuttle sweeps across, the hammers are actuated at each position in the dot row at which a dot is required and the paper is vertically fed one dot row after each full sweep. The process continues through a total of 7 sweeps (or 9 sweeps when descender characters are to be printed) and then the paper is moved by one character line space, and the process is then repeated for the next line of characters.

Several U.S. Patents are directed to various aspects of dot matrix line printers including: Nos. 3,941,051; 4,127,334; 4,236,835.

U.S. patent application No. 259,697, filed May 1, 1981 discloses an improved dot matrix line printer/plotter including multiple print element banks, each mounted to shuttle across the paper path, and operable to concurrently print different dot rows. The multiple banks are coupled to a common shuttle drive motor and arranged so as to sweep in opposite directions to present an essentially balanced load to the motor. In the disclosed embodiment, each bank carries a plurality of hammer assemblies physically supported on a circuit board mounted for linear reciprocal movement. Each such board preferably carries all of the electronic circuitry uniquely associated with the hammer bank supported thereon. Switch means are provided for enabling a user to selectively disable one of said multiple banks to permit the printer to continue to function even if only one of the banks is operable.

SUMMARY OF THE INVENTION

The present invention is directed to an improved control system for a dot matrix line printer for accepting externally supplied data defining a character line to be printed and for deriving dot data bits therefrom to appropriately actuate print elements carried by one or more shuttling banks.

The control system in accordance with the invention includes an input/output (I/O) microprocessor and a print control microprocessor, each connected so as to have access to a common read/write random access memory (RAM). A portion of the RAM is used as multiple line buffers with each line buffer being used to store all the character bytes which define a character line to be printed. The I/O microprocessor accepts externally supplied data and loads character bytes for each sequential character line into a different line buffer. During each bank sweep, the print control processor causes character bytes to be accessed from the line buffer storing the character line to be printed.

In a preferred embodiment of the control system, particularly suited for use in a printer with multiple banks, a buffer assignment status memory is provided, preferably part of said RAM, which is used by the I/O processor to keep track of where (i.e. which line buffer) each character line is stored. The print control processor accesses the buffer assignment status memory for the purpose of retrieving character line data from the line buffers in the sequence in which it is used, which in a multiple bank printer, is generally different from the sequence in which it is supplied to the I/O processor.

In accordance with one aspect of the preferred embodiment, a mapper subsystem is provided which operates in conjunction with the print control processor to access character bytes in the appropriate sequence from the line buffer storing the character line to be printed. For a bank comprised of N hammers, each capable of printing a dot in C×D dot positions, N character bytes are accessed for each of C×D dot positions and a single dot data bit is derived from each such byte accessed.

In accordance with a further aspect of the preferred embodiment, the print control processor periodically tests the operability of the multiple banks. In the event a disabled bank is recognized, the processor can thereafter process the character line data from the line buffers so as to direct all such data to the operable bank(s), essentially disregarding the disabled bank, and enabling the printer to continue printing, albeit at a slower speed.

In accordance with a still further aspect of the preferred embodiment, the print control processor operates in conjunction with a timer circuit to supply shuttle step and hammer actuate (fire) pulses at time intervals defined by stored tables accessed by the print control processor. An open loop circuit is used to apply the shuttle step pulses to a stepper motor driving the hammer banks.

In accordance with a still further feature of the preferred embodiment, the time duration of current supplied to the hammer assembly coils when actuated is varied dependent upon the coil supply voltage level in order to maintain the hammer energy substantially constant.

BRIEF DESCRIPTION OF THE DRAWINGS

A better understanding of the invention may be had by reference to the following description, taken in conjunction with the accompanying drawing in which:

FIG. 4 is a block diagram depicting the processor printed circuit board of FIG. 3 in greater detail;

FIG. 5A is a timing chart depicting shuttle step and hammer fire pulses relative to the velocity profile of the hammer bank shuttle, and FIG. 5B is a timing chart depicting the relationship between hammer fire pulses and hammer bank update operations;

DESCRIPTION OF THE PREFERRED EMBODIMENT

Figure 1:
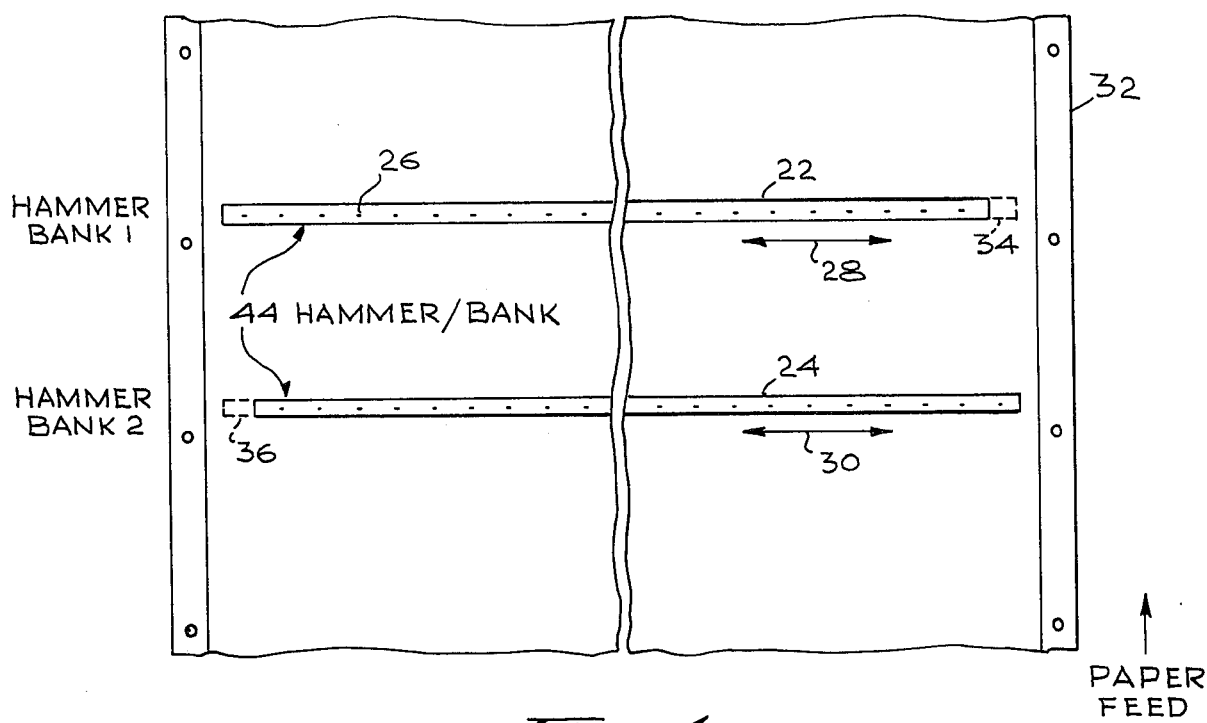
FIG. 1 is a schematic representation generally depicting a dual hammer bank dot matrix line printer.

Attention is directed to FIG. 1 which generally depicts the operation of a multiple hammer bank dot matrix line printer of the type disclosed in pending U.S. patent application No. 259,697. The printer apparatus represented in FIG. 1 includes first and second hammer banks 22 and 24. Each hammer bank carries a plurality of individually actuatable dot print elements 26 mounted in alignment along the bank. The banks 22 and 24 are mounted so as to shuttle, as depicted by the arrows 28 and 30, in the direction of their elongation. A paper web 32 is depicted in FIG. 1, mounted for movement along a path defined by a paper feed subsystem, including a paper step drive motor. The paper web 32 moves along the path in a direction parallel to the elongation of the paper web. The banks 22 and 24 are mounted in close proximity to the paper web 32 extending substantially perpendicular to the direction of paper movement.

As described in the aforementioned patent application, the hammer banks 22 and 24 are mounted so as to shuttle back and forth along print rows extending across the width of the paper web 32, thus sweeping each dot print element 26 across a field comprising a portion of the paper width. In this manner, as each hammer bank shuttles across the width of the paper, the print elements, or hammers, can be actuated at selected positions to print dots along a print row. After each dot row is printed, the paper web 32 is stepped and a subsequent dot row can be printed, thus enabling characters (e.g. alphanumeric and arbitrary symbols), as well as arbitrary dot patterns, to be formed on the paper.

In order to enhance the clarity of the description herein, an exemplary printer apparatus will be assumed utilizing two hammer banks 22 and 24, each carrying forty four dot hammers. However, it should be understood that the teachings of the invention are applicable to printers having one to more hammer banks and utilizing virtually any number N of hammers.

Figure 2:
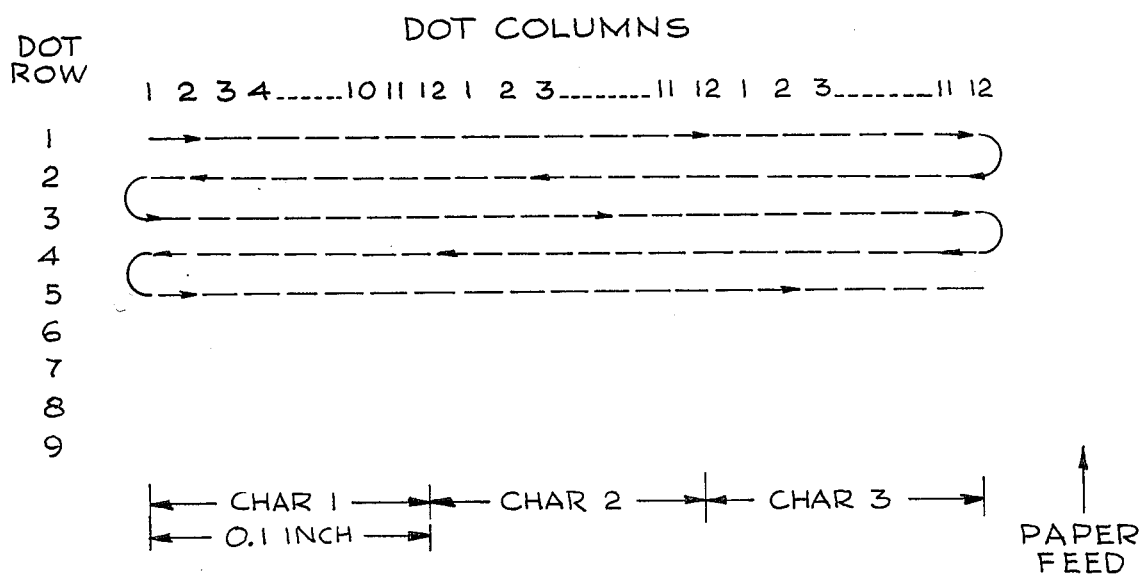
FIG. 2 is a schematic representation generally depicting the path traced by a single hammer relative to a moving paper web in a typical dot matrix line printer.

FIG. 2 depicts the effective field traced by a single dot hammer as the hammer sweeps across the field with the paper being stepped between successive sweeps. In the exemplary embodiment assumed herein, each hammer will sweep across C (assumed to be 3 is a normal mode and 4 or 5 in higher density compressed print modes) character positions. Each character position is defined by a matrix of dot positions comprised of D (assumed to be 12) horizontally displaced dot columns and R (assumed to be 9) vertically displaced dot rows. The width of each character matrix is assumed to be 0.1 inches. Thus, since each hammer sweeps across three characters, it follows that each bank will be displaced a distance of 0.3 inches from one extreme to the other. As is explained in the aforementioned patent application, it is preferrable to mount the hammer banks 22 and 24 so that they concurrently move in opposite directions as is depicted by the dashed line representation 34 and 36 in FIG. 1.

As is depicted in FIG. 2, each hammer will sweep across $C \times D$ dot positions in order to print each dot row, moving from left to right along dot row 1 and then after the paper is stepped one dot row, from right to left along dot row 2. As the hammer traverses the thirty six dot positions, it is selectively actuated to print dots in any of the $C \times D$ dot positions. Inasmuch as the hammer bank carries N hammers, it is necessary during each hammer bank sweep across the paper to supply $N \times D \times C$ dot data bits for each bank to identify the positions at which dots are to be printed along each dot row.

Figure 3:
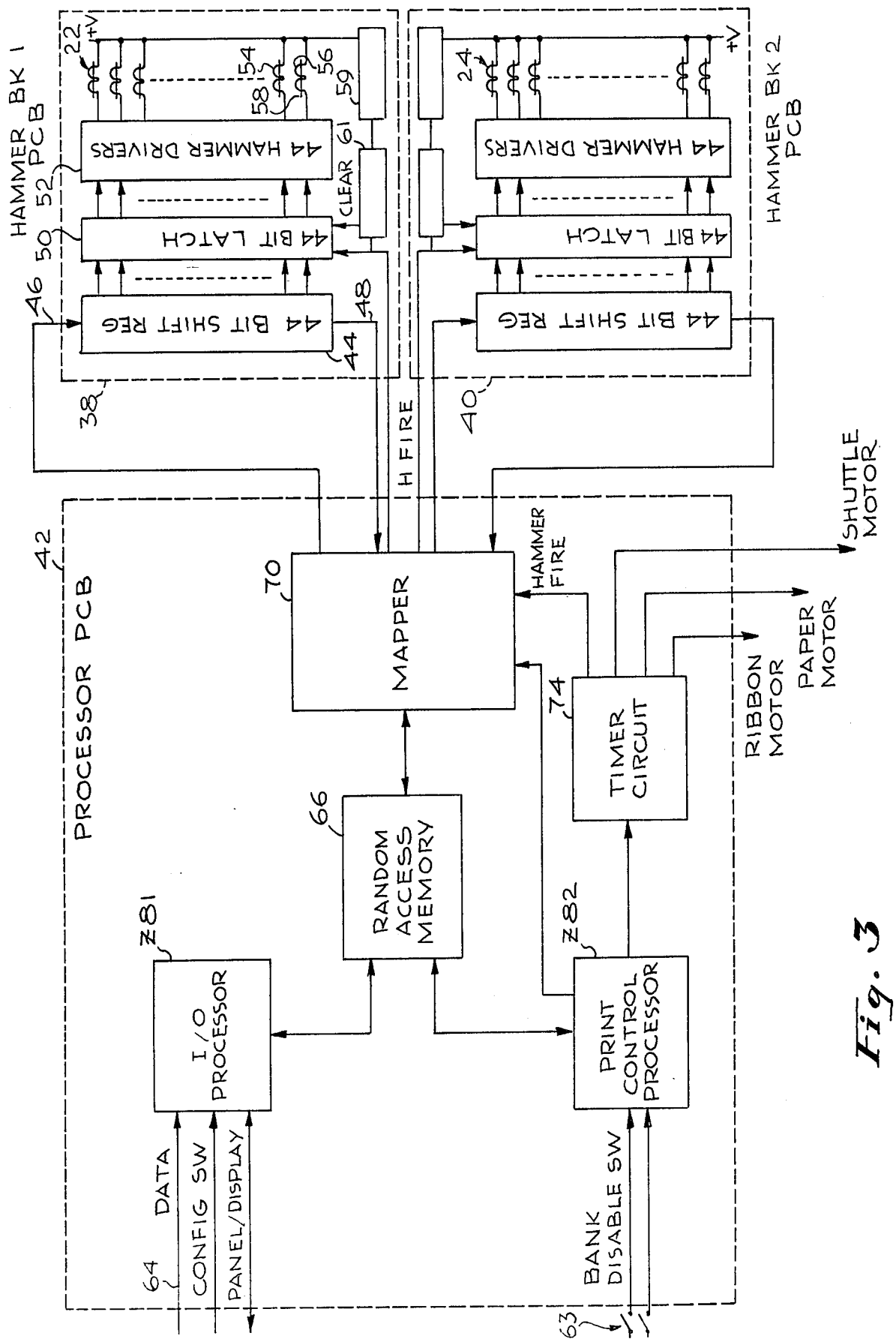
FIG. 3 is a block diagram generally depicting a preferred embodiment of a control system in accordance with the present invention.

Attention is now directed to FIG. 3 which comprises a block diagram of a dual bank dot matrix line printer incorporating a control system in accordance with the present invention. As is described in the aforementioned pending patent application, it is preferrable to mount each hammer bank 22 and 24 on a separate printed circuit board, which board is mounted for linear reciprocal movement, and which carries the electronic circuitry unique to that bank. Thus, FIG. 3 depicts hammer bank 22 as being mounted together with its supporting electronics on printed circuit board 38. Hammer bank 24 with its supporting electronics is mounted on printed circuit board 40. A processor circuit board 42 carries the electronic circuitry for controlling both boards 38 and 40.

Each hammer bank circuit board 38, 40 carries a forty four bit shift register 44 having an input terminal 46 and an output terminal 48. As will be better understood hereinafter, for each of the $C \times D$ dot positions swept by each hammer, forty four dot data bits are entered into the shift register 46. After each group of forty four dot data bits are loaded into the register 44, they can be transferred in parallel to a forty four bit latch 50 to enable the subsequent loading of the shift register 44. The forty four bits in latch 50 are used to control forty four hammer drivers 52. Each hammer driver 52 controls one of forty four hammers 54. It is pointed out that the term "hammer" as used herein is intended to encompass any type of print element capable of printing a single dot. Thus, a hammer can comprise an impact device in which a wire or other structural member is propelled against the paper being printed upon. Such devices are well known and include, for example, solenoid or stored energy devices. On the other hand, the term "hammer" is also intended to include other non-impact print elements such as ink jets or thermal wires. Thus, the hammer assemblies 54 depicted in FIG. 3 as comprising a coil 56 and wire or hammer tip 58 should be understood as being exemplary only.

A typical hammer assembly 54 uses a stored energy spring which is held in a retracted position by a magnet (not shown). The coil 56 is energized by supplying a current to it (in response to a hammer fire pulse supplied by mapper 70) which nulls the magnetic field to permit the stored energy hammer to accelerate forward and strike the paper. In order to assure that the hammers strike with substantially uniform energy despite variations in the voltage supply used to generate the coil current, it is preferable to include a sensor 59 to monitor the voltage $+V$. The sensor 59 in turn controls a simple timer circuit 61 to extend the coil current "on" time if the voltage drops and reduce the "on" time if the voltage increases.

The processor printed circuit board 42 carries the common electronic circuitry for controlling the hammer bank printed circuit boards 38 and 40 in response to data externally supplied on input terminal 64, defining character lines to be printed. As will be described in greater detail in connection with FIG. 4, the common control circuitry on processor board 42 includes two microprocessors; namely an input output (I/O) microprocessor and a print control microprocessor. Although any of several commercially available microprocessors can function suitably in accordance with the invention, it will be assumed herein that each of the microprocessors comprises a Z80 manufactured by Zilog. The I/O microprocessor and the print control microprocessor will be respectively referred to herein by the designations Z81 and Z82. It should be understood however that the two microprocessors can be structurally identical, differing only in their control programs stored in their read only memories.

The microprocessors Z81 and Z82 are coupled to a read/write random access memory 66. Each of the processors Z81 and Z82 can write information in and read information from the memory 66. As will be discussed in greater detail hereinafter, the I/O processor Z81 accepts externally supplied data defining character lines to be printed and in turn loads the character bytes for each such line into a separate line buffer within the memory 66. The print control processor Z82, in turn, accesses the character bytes, as needed by the hammer bank printed circuit boards 38 and 40. The character line data stored within the line buffers primarily comprises multiple character bytes, e.g. 132 character bytes per line. Each character byte is typically defined by eight bits coded in accordance with a well known code such as ASCII. The print control processor Z82 determines the sequence in which character bytes must be accessed from the memories 66 in order to supply the dot data bits to the shift registers 44 as required. As will be explained hereinafter, the print control processor Z82 controls the mapper subsystem 70 which receives character bytes from the memory 66 and derives from each character byte a single dot data bit. The mapper subsystem 70 supplies successive dot data bits to the registers 44 on terminals 46. As will also be explained hereinafter, the mapper subsystem 70 accepts the serial output from the shift registers 44 enabling the mapper subsystem to check on the operability of each hammer bank.

The print control processor Z82 also controls a timer circuit 74 which develops timing pulses for hammer fire, shuttle motor control, paper motor control, and ribbon motor control.

As was mentioned in patent application No. 259,697, a BANK DISABLE switch is provided for each bank which can be operated by the user (or automatically by the print control processor itself in response to a test bank routine, to be discussed) when either bank fails. These switches 63 comprise inputs to the processor Z82 enabling the processor to operate differently (FIGS. 9A and 9B) depending upon whether one or both banks are enabled.

Attention is now directed to FIG. 4 which comprises a more detailed block diagram of the control system circuitry on processor board 42 of FIG. 3. As has been previously noted, the processor board control circuitry includes an I/O processor Z81 and a print control processor Z82 which can be identical with each being tasked to perform certain functions as determined by a stored control program. The processors Z81 and Z82 are connected through a conventional cycle steal subsystem 100 to a read/write random access memory 66 enabling each of the processors to write information in and read information from the addressable locations within memory 66. The utilization and organization of the memory 66 will be discussed in greater detail hereinafter.

Each of the processors Z81 and Z82 has an address bus and a data bus as well as a control terminal connected to an address decoder. The address decoders 102 and 104 at any point in time, control which of various devices coupled to the address and data buses of processors Z81 and Z82 are to be active.

Initially considering the I/O processor Z81, it will be noted in FIG. 4 that a control program programmable read only memory (PROM) 105, a serial I/O interface 106, a parallel I/O interface 108, configuration switches 110, and a front panel/display device 112, all have outputs connected to the I/O processor data bus. The selection of which of these devices is to be active at any point in time is determined by the address decoder 102. The function of the control program PROM is, as is well known, to provide the application instructions to the processor Z81. The serial interface 106 and the parallel interface 108 are essentially standard units and function to accept externally supplied data defining character lines to be printed and to interrupt the Z81 processor when such data is available. After the Z81 processor is interrupted by either interface 106 or 108, it will thereafter, in accordance with its control program in PROM 105 accept the input data on its data bus. The configuration switches 110 comprise switches available to the printer user enabling various parameters to be defined such as the number of characters per line, the number of lines per inch, etc. The front panel/display is used primarily to accept certain inputs from the user and to display certain status information to the user.

The devices connected to the print control processor Z82, in addition to the aforementioned mapper 70 and timer circuit 74, include a control program PROM 116, a shuttle step drive subsystem 118, a paper step drive subsystem 120, a ribbon step drive subsystem 122, and a ribbon sense subsystem 124.

The random access memory 66 is organized into 5 different areas including a scratch pad area 130, a variable forms area 132 and a line buffer area 134. For purposes herein, it will be assumed that the scratch pad area 130 has a capacity of 184 bytes and the variable forms area 72 bytes. The line buffer area 134 comprises multiple line buffers, herein illustrated as LB1 through LB7. Each of the line buffers has a capacity of 256 bytes and each is used, as will be explained in greater detail hereinafter, to store character byte and control information with respect to a single character line to be printed. In operation, to be discussed in greater detail hereinafter in connection with the explanation of the buffer assignment flow chart of FIGS. 9A, 9B the Z81 processor accepts externally supplied character line data and stores that character line data, in appropriate format, in an available line buffer. The print control processor Z82, in conjunction with the mapper 70, accesses the character line data from the line buffers, as needed, to derive dot data bits, as required by the hammer banks. At this point in the description, it should be understood that the character line data is stored in the line buffers by the Z81 processor in coded, e.g. ASCII, form. Thus, in each line buffer containing 256 bytes, 220 bytes are used as character bytes identifying a particular alphanumeric or arbitrary symbol in ASCII coded form. The additional 36 bytes can be used for various purposes including one bit for each of the 220 character bytes to indicate whether the character represented by the character byte is to be underlined when printed.

The mapper 70 will be discussed in greater detail hereinafter in connection with FIGS. 10 and 11. Suffice it to point out at this point that the mapper consists primarily of a mode and sequence control unit 140, a bidirectional dot counter 142, a bidirectional character counter 144, a multiplexer 146, a character or font PROM 148, and a hammer bank driver/receiver 150. Prior to proceeding with the more detailed discussion of the buffer assignment operation and the mapper operation, the overall operation and function of the control system of FIG. 4 will be discussed.

In order to better appreciate the function that need be performed by the control system of FIG. 4, attention is initially directed to the following Table I which depicts the sequence of dot positions for a single hammer on bank 1 and a single hammer on bank 2 in the normal operation of the printer. In constructing Table I it has been assumed that the printer is printing at six character lines per inch and that the respective hammer bank print rows are spaced by ½ inch so that the hammer banks will simultaneously operate on character lines spaced by three character lines. That is, when hammer bank 1 is printing character line 1, hammer bank 2 will be printing character line 4. Table I also assumes that 132 characters are being printed per line and that each character matrix consists of 12 dot columns or counts and 9 dot rows. Additionally, consistent with FIG. 2 herein, it is assumed that each hammer traverses a field comprised of three characters (although it should be recalled that the field can include 4 or 5 characters when operating in a compressed print mode). Table I depicts the character positions for the leftmost hammer on hammer bank 1 traversing character positions 1, 2 and 3 and for the rightmost hammer on hammer bank 2 traversing character positions 132, 131 and 130. Thus, if the hammer bank 1 starts in its extreme left position and hammer bank 2 in its extreme right position, then hammer bank 1 will start printing character line 1, dot row 1, character count 1, and dot count 1. Simultaneously the rightmost hammer on hammer bank 2 will be working on character line 4, dot row 1, character count 132, and dot count 12. Inasmuch as each hammer will traverse 36 dot positions (C×D) in a single sweep to the left or right, in accordance with the technique of the present invention, the memory 66 will be accessed 36 times with a single dot data bit being derived with respect to each of those memory accesses. It should be understood however that inasmuch as each hammer bank carries N hammers (assumed to be 44), it is necessary to access the memory 66 N×C×D (44×3×12) for each hammer bank in accordance with the preferred embodiment of the invention. Actually twice this number of memory accesses is required in accordance with the preferred embodiment inasmuch as two hammer banks are utilized.

TABLE I

| Memory Access | Hammer Bank 1 | | | | Hammer Bank 2 | | | | |
| --- | --- | --- | --- | --- | --- | --- | --- | --- | --- |
| | Char Line | Dot Row | Char Ct | Dot Ct | Char Line | Dot Row | Char Ct | Dot Ct | |
| | → | | | | ← | | | | |
| (1) | 1 | 1 | 1 | 1 | 4 | 1 | 132 | 12 | |
| (2) | 1 | 1 | 1 | 2 | 4 | 1 | 132 | 11 | |
| . | | | | | | | | | |
| (12) | 1 | 1 | 1 | 12 | 4 | 1 | 132 | 1 | |
| (13) | 1 | 1 | 2 | 1 | 4 | 1 | 131 | 12 | |
| (14) | 1 | 1 | 2 | 2 | 4 | 1 | 131 | 11 | |
| . | | | | | | | | | |
| (36) | 1 | 1 | 3 | 12 | 4 | 1 | 130 | 1 | Dot Row |
| | ← | | | | → | | | | SP |
| (1) | 1 | 2 | 3 | 12 | 4 | 2 | 130 | 1 | |
| (2) | 1 | 2 | 3 | 11 | 4 | 2 | 130 | 2 | |
| . | | | | | | | | | |
| (12) | 1 | 2 | 3 | 1 | 4 | 2 | 130 | 12 | |
| (13) | 1 | 2 | 2 | 12 | 4 | 2 | 131 | 1 | |
| (14) | 1 | 2 | 2 | 11 | 4 | 2 | 131 | 2 | |
| . | | | | | | | | | |
| (36) | 1 | 2 | 1 | 1 | 4 | 2 | 132 | 2 | Dot Row |
| | → | | | | ← | | | | SP |
| (1) | 1 | 9 | 1 | 1 | 4 | 9 | 132 | 12 | |
| . | | | | | | | | | |
| (36) | 1 | 9 | 3 | 12 | 4 | 9 | 130 | 1 | Char Line |
| | ← | | | | → | | | | SP |
| (1) | 2 | 1 | 3 | 12 | 5 | 1 | 130 | 1 | |
| . | | | | | | | | | |
| | ← | | | | → | | | | |
| (36) | 2 | 9 | 1 | 1 | 5 | 9 | 132 | 12 | |
| . | | | | | | | | | |
| | → | | | | ← | | | | |
| (1) | 3 | 1 | 1 | 1 | 6 | 1 | 132 | 12 | |
| . | | | | | | | | | |
| | → | | | | ← | | | | |
| (36) | 3 | 9 | 3 | 12 | 6 | 9 | 130 | 1 | Inc 3 |
| | ← | | | | → | | | | Char |
| (1) | 7 | 1 | 3 | 12 | 10 | 1 | 130 | 1 | Lines + Line |

TABLE I-continued

| Memory Access | Hammer Bank 1 | | | | Hammer Bank 2 | | | |
|---|---|---|---|---|---|---|---|---|
| | Char Line | Dot Row | Char Ct | Dot Ct | Char Line | Dot Row | Char Ct | Dot Ct |
| | | | | | | | | SP |

Table I depicts that after each dot row is printed, e.g. dot row 1, the paper is moved by one dot row space. After the completion of a character line, i.e. 9 dot rows, the paper is stepped by a character line space. It should also be noted that after hammer bank 1 finishes printing character line 3 and hammer bank 2 finishes printing character line 6, then it is necessary for the system to thereafter supply character line 7 data to hammer bank 1 and character line 10 data to hammer bank 2. This will be discussed in greater detail in connection with the buffer assignment operation, but at this point it should be understood that as data for character lines are successively supplied via interfaces 106 or 108 to the I/O processor Z81, that character line data must be handled in a manner which enables hammer bank 1 to successively print character lines 1, 2 and 3 while hammer bank 2 is printing character lines 4, 5 and 6 while thereafter hammer bank 1 will print character lines 7, 8 and 9 and hammer bank 2 will print character lines 10, 11 and 12. With the foregoing operation of the printer in mind, the overall function of the control system of FIG. 4 will be described. The I/O processor Z81 responds to interrupts generated by the units 106 or 108 to accept externally supplied data comprised of character bytes and certain control informations such as line density, line feed, etc. The I/O processor in turn stores the character bytes associated with each character line, and certain related information such as character underlining, in an available line buffer in the memory 66. Additionally, the I/O processor stores status information, to be discussed, in the scratch pad area 130 of memory 66 which identifies the sequence of the character line stored in the line buffers. This status information stored in the scratch pad area is used to permit the I/O processor Z81 to indicate to the print control processor Z82 that one of the line buffers is ready for printing. In turn, the processor Z82 can modify that status information, as will be described, to communicate to the processor Z81 that a particular line has been printed and that the buffer containing that line data is available for storage of a new character line. In a typical sequence, data with respect to a line comes through processor Z81 and is stored in line buffer 3. When processor Z81 recognizes the end of the stored line, e.g. a line feed code, it sets a status ready bit in the scratch pad associated with line buffer 3. Processor Z81 then can immediately begin to work on the next arriving externally supplied data. The processor Z82, upon recognizing a ready status bit, meaning that there is data in a line buffer ready for printing, will activate the mapper 72 and the shuttle step drive subsystem. The mapper then will access the character bytes from the designated line buffer and for each character byte will derive a dot data bit appropriate to the dot row character count and dot count for each hammer.

FIG. 5A illustrates in line (a) a shuttle velocity profile versus time produced as a consequence of supplying shuttle step pulses to the shuttle stepper motor coupled to the hammer banks. Line (b) of FIG. 5A depicts the shuttle step pulses which starting from time T1 are relatively widely spaced in order to ramp the shuttle up to speed. Between times T2 and T3 the shuttle step pulses are supplied at a substantially uniform rate to run the shuttle stepper motor at a substantially constant velocity. Between Time T3 and T4 the shuttle step pulses are again more widely spaced to slow down the shuttle stepper motor and permit it to ramp up in the opposite direction between times T4 and T5. Then again between times T5 and T6 the shuttle motor will be driven at substantially constant velocity in the opposite direction and then slowed down again between times T6 and T7. While the shuttle is being driven, hammer fire pulses as depicted in line (c) are generated to actuate the hammers in accordance with dot data bit information supplied to their hammer banks by the mapper 70. In an actual embodiment of the present invention, 48 shuttle step pulses are applied to the shuttle stepper motor to increment it through one full sweep, i.e. between times T1 and T4. During that interval, 36 (i.e. C×D) hammer fire pulses are generated to fire the hammers. As will be seen hereinafter, the shuttle step and hammer fire pulses are generated by the counter timer circuit 74 which is controlled by the processor Z82 from an empirically derived stored table. That is, as will be discussed further in connection with FIGS. 6 and 7, the shuttle stepper motor is driven in an open loop fashion by supplying shuttle step pulses thereto in accordance with data stored in a shuttle step timing table. Similarly, the hammer fire pulses are developed by the counter timer circuit 74 under the control of the processor Z82 based upon a stored hammer fire timing table. Both the shuttle step and hammer fire pulse sequences are initiated at the same time but thereafter, each pulse train is generated separately by the counter timer circuit depending upon its own stored table.

FIG. 5B illustrates the hammer fire pulses of FIG. 5A on an expanded scale. In line (a) the hammer fire pulses are shown. A hammer fired flip flop is set in response to each hammer fire pulse. In response to the hammer fired flip flop being set (line (b)), the control processor Z82, in conjunction with the mapper 70, updates hammer bank 1. That is, it causes the mapper 70 to supply 44 dot data bits to the hammer bank bit shift register 44. After hammer bank 1 is updated, hammer bank 2 is similarly updated and then the processor Z82 enters a wait loop (line (e)) until the next hammer fire pulse again initiates the update operation.

Figure 6:
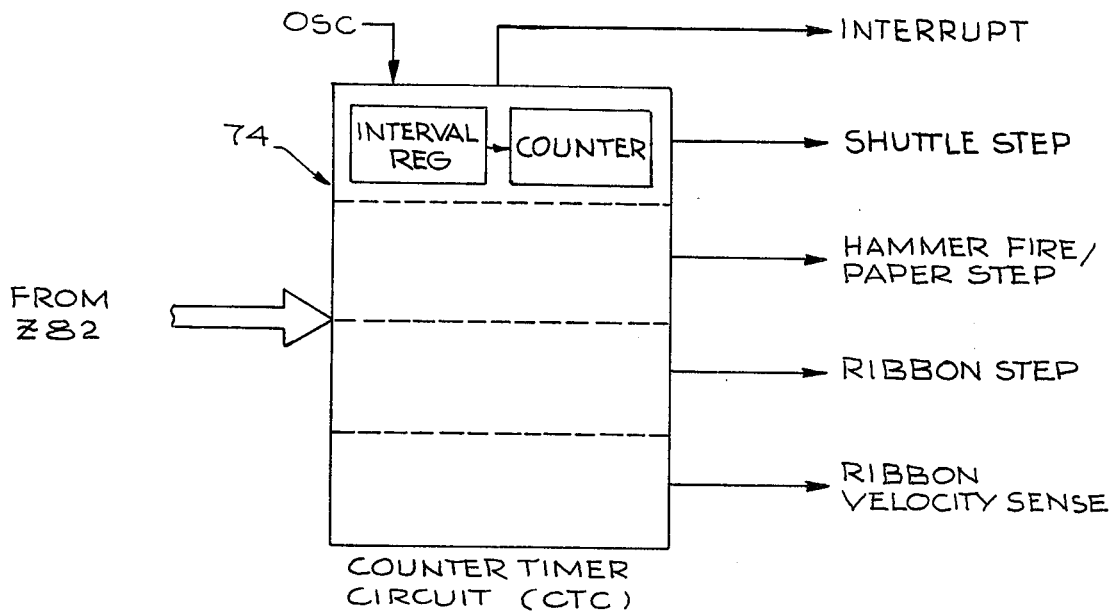
FIG. 6 is a schematic representation of a counter timer circuit utilized in the control system depicted of FIG. 4.

FIG. 6 illustrates the counter timer circuit 74. The counter timer circuit is a commercially available semiconductor chip which includes four timer channels. Each of the channels includes an interval register and a counter. The print control processor Z82 is coupled to the counter timer circuit so as to be able to load any value into each interval register. The value loaded into an interval register is transferred to its associated counter which is then counted down in accordance with an input to the timer circuit chip from an oscillator. When each counter counts down to zero, it supplies a pulse on its associated output line. The counter timer circuit 74 has four output channels which are respectively used to generate shuttle step pulses, hammer fire/paper step pulses, ribbon step pulses, and ribbon velocity sense pulses. The interval between successive pulses on each channel is thus determined by the interval value loaded into the interval register of that channel by the processor Z82. As previously discussed, the shuttle step and hammer fire pulses are generated at intervals determined by stored tables accessed by the processor Z82.

Figure 7A:
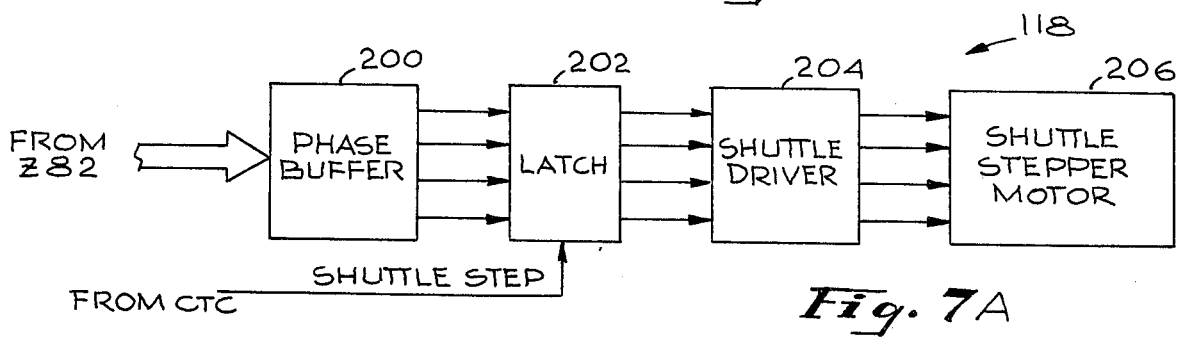
FIG. 7A is a block diagram depicting the shuttle drive subsystem.
Figure 7B:
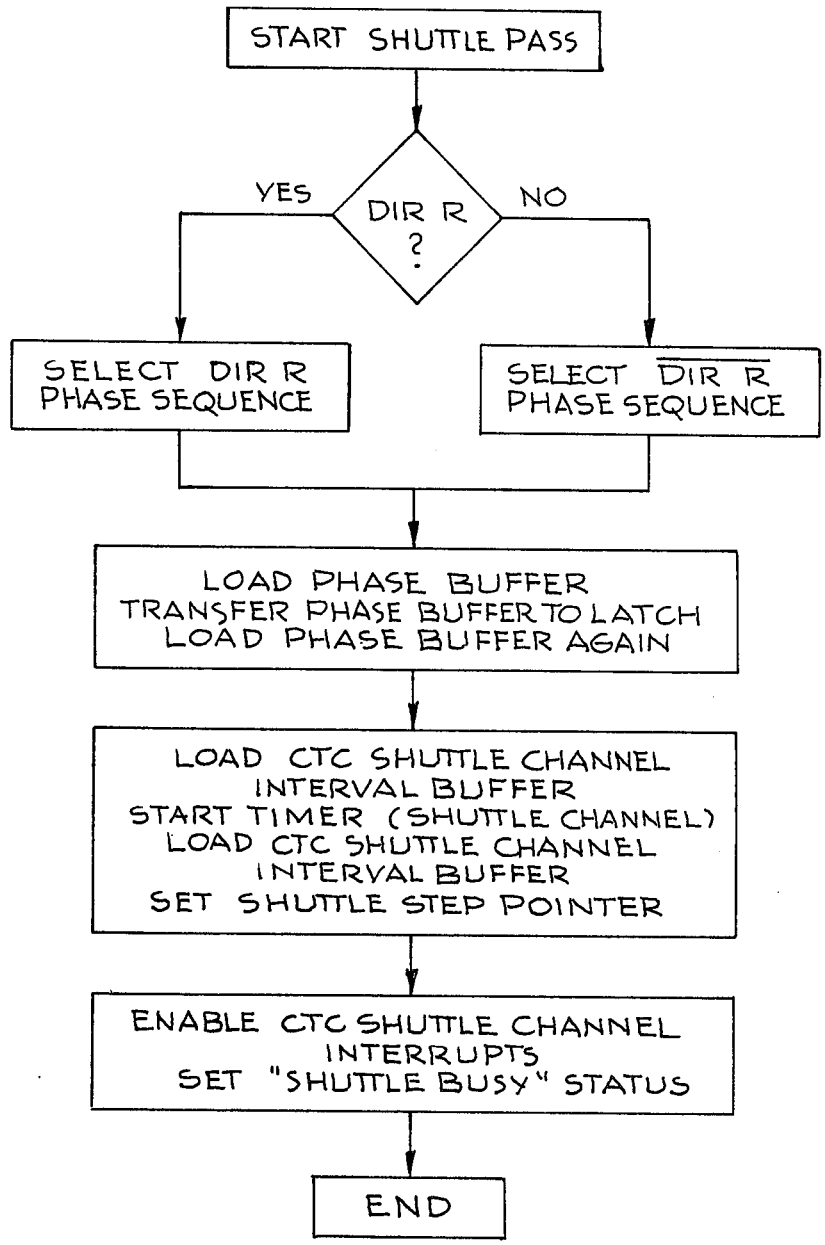
FIGS. 7B and 7C are flow charts describing the operation of the subsystem.
Figure 7C:
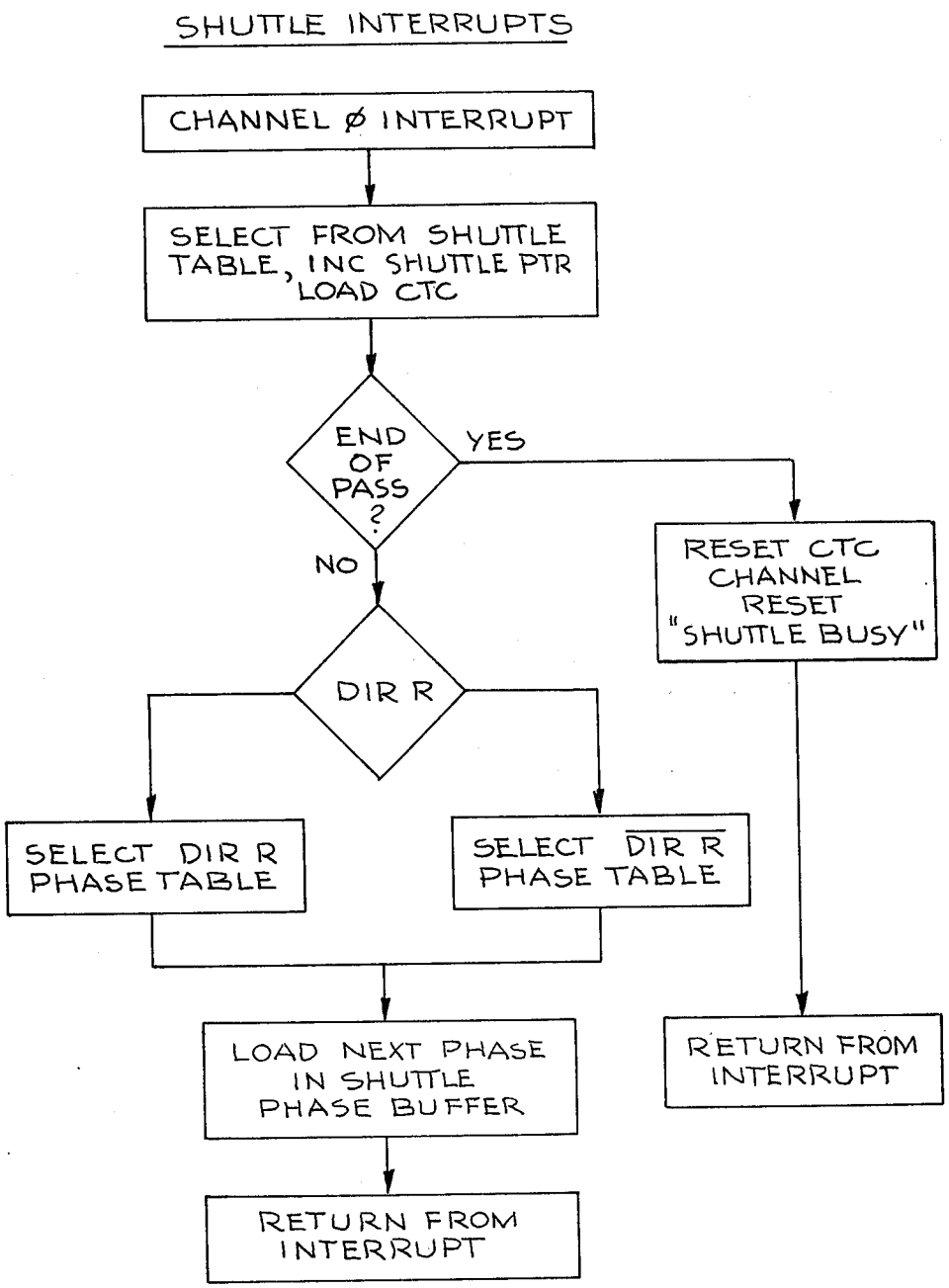

FIG. 7A illustrates the shuttle step drive subsystem which includes a phase buffer 200, a latch 202, a shuttle driver 204, and a shuttle stepper motor 206. The operation of stepper motors is well known in the art and basically involves supplying phase data to the stepper motor in the appropriate sequence and at the appropriate intervals in order to step the motor in either a forward or reverse direction. In accordance with the preferred embodiment, the print control processor Z82 performs the following steps in executing a shuttle pass (see FIGS. 7A and 7B):

1. Determines the direction (left or right) of the next shuttle pass and selects the appropriate stored phase table;
2. Loads the phase buffer 200 with the next phase;
3. Transfer the phase buffer 200 into the latch 202 by issuing a shuttle step pulse. The shuttle driver 204 responds to the phase number in the latch 202 to drive the motor 206 to the phase position defined by the phase number.
4. Loads the phase buffer with the next phase.
5. Loads the CTC shuttle channel interval buffer with the interval value from the stored shuttle timing table.
6. Starts the shuttle channel timer.
7. Loads the shuttle channel interval buffer with the next interval from the stored table.
8. Sets a shuttle stepper pointer (SHSTPT) to the current position in the stored timing table.
9. Enable the CTC shuttle channel interrupt capability.
10. Set "shuttle busy" status.

All remaining shuttle control is provided in response to the CTC shuttle channel timing out which cause two things to happen:

First, a SHUTTLE STEP pulse is generated which transfers the phase buffer 200 into the latch 202 thereby advancing the stepper. Second, an interrupt from the shuttle channel is set to the print control processor Z82. This second event causes Z82 to execute interrupt routine code which is flow charted in FIG. 7C and is described in the following steps:

1. Using the shuttle step pointer (SHSPPT) as a guide, Z82 retrieves the next interval from the stored shuttle timing table and loads the CTC shuttle channel interval buffer.
2. An interrupt count variable is incremented and tested for the end of the pass (see step 2A).
3. Depending on shuttle direction the appropriate shuttle phase table is selected and the next phase is loaded into the shuttle phase buffer 200.
4. Z82 interrupt ends and control is passed to the main program.

Step 2A: If the end of pass count is detected in step 2 above the CTC shuttle channel is reset (deactivated), the "SHUTTLE BUSY" status is removed and Z82 control is returned to the main program.

Figure 8:
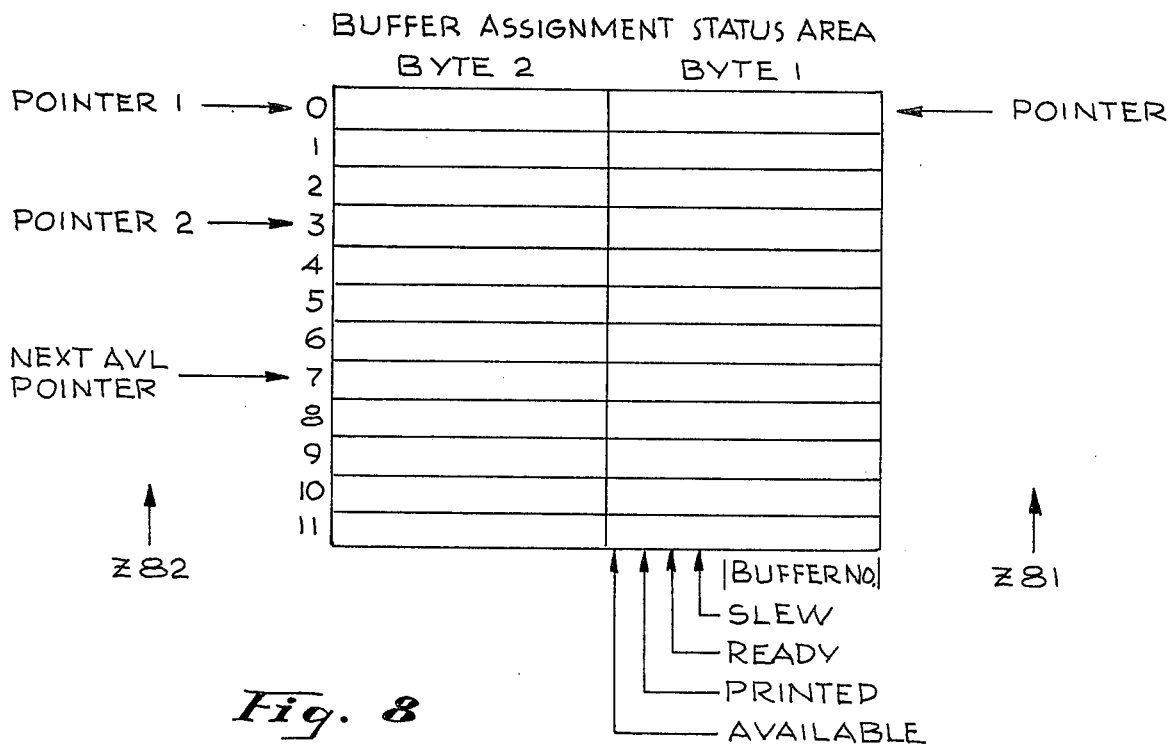
FIG. 8 is a schematic representation of the buffer assignment status area within the random access memory of FIG. 4.

Attention is now directed to FIG. 8 which schematically represents a 24 byte portion of the scratch pad area 130 of memory 66. The 24 byte portion depicted in FIG. 8 is used as a line buffer assignment status area for the purpose of enabling the I/O processor Z81 to store successive character lines in line buffers as they become available and to enable the print control processor Z82 to access the character line data from the line buffers as required. It is important in this regard to recognize that the print control processor Z82, when the printer is operating with both hammer banks, does not access character lines in the sequence in which they are accepted by the I/O processor Z81. That is the I/O processor will generally accept the character lines in the sequence in which they are to ultimately appear on the printed output. On the other hand, when printing with two banks, as is represented in the aforediscussed table, the print control processor Z82 will have to access character lines 1 and 4 essentially concurrently, character lines 2 and 5 essentially concurrently, character lines 3 and 6 essentially concurrently, character lines 7 and 10 essentially concurrently, etc. The seven line buffers depicted in FIG. 4 are provided to enable the I/O processor to store up to seven lines to thus enable the printer to simultaneously print with two banks.

The line buffer assignment status area of FIG. 8 utilizes 12 buffer assignment (bufas) locations, each comprised of two bytes. For explanation purposes herein, it is byte 1 of each bufas that is of primary concern. The four low order bits of each byte 1 are used for storing a line buffer number. The high order four bits of byte 1 of each bufas are used respectively as slew, ready, printed and available control bits. The operation of the buffer assignment status area in conjunction with processors Z81 and Z82 will be explained in connection with the flow charts of FIGS. 9A and 9B. Prior to discussing the flow charts however, it should be understood that each of the processors maintains certain pointer values which direct it to particular bufas locations. Thus, the I/O processor Z81 maintains a pointer identifying one of the 12 bufas locations 0–11. The print control processor Z82 maintains three separate pointer values identified as pointer 1, pointer 2, and "next available" pointer. As will be better understood hereinafter, when both banks are operating, pointers 1 and 2 will respectively point to the bufas locations whose contents identify the line buffers storing the line currently being operated upon by hammer banks 1 and 2 respectively. The next available pointer identifies the bufas location which the print control processor will next make available to the I/O processor for storing a subsequent character line.

Before proceeding to an explanation of the flow charts of FIG. 9, the basic scheme by which buffer assignments are made will be discussed. The print control processor Z82 initially sets up seven bufas locations, i.e. 0–6, and stores in the lower four bits thereof, the identification of one of the seven line buffers. Thus for example, bufas location 0 will identify line buffer 1, bufas location 1 will identify line buffer 2, etc. During this initialize operation, bufas locations 0–6 will each be assigned a line buffer number and the next available pointer of the processor Z82 will point to bufas location 7, that is the first non-assigned bufas location. During the initialize procedure when the print control processor Z82 assigns bufas locations to line buffer numbers, it also sets the available control bit within each assigned bufas location. The I/O processor Z82 examines the available control bits in a sequence determined by its pointer, and utilizes line buffers identified by bufas locations having set available bits. When the I/O processor Z81 stores character line data within an available line buffer, it sets the ready control bit in the associated bufas location. The print control processor Z82 in turn responds to the set ready bits to cause the associated line buffers to be accessed by the mapper 70. The Z82 pointers 1 and 2 essentially move down through the bufas locations depicted in FIG. 8, or looked at differently, the bufas locations move upwards past the pointers 1 and 2. As previoulsy mentioned, the pointers point to bufas locations which identify line buffers storing data currently being printed by the hammer banks 1 and 2 respectively. Inasmuch as each bufas location pointed to by pointer 2 will later move past pointer 1, a mechanism must be provided to prevent the same character line from being printed twice. Thus, as will be seen in connection with the flow chart of FIG. 9A, when a line stored in a line buffer is printed by hammer bank 2, then the print control processor Z82 sets the printed control bit of the associated bufas location such that when that bufas location effectively moves up past pointer 1, it is not reprinted.

Figure 9A:
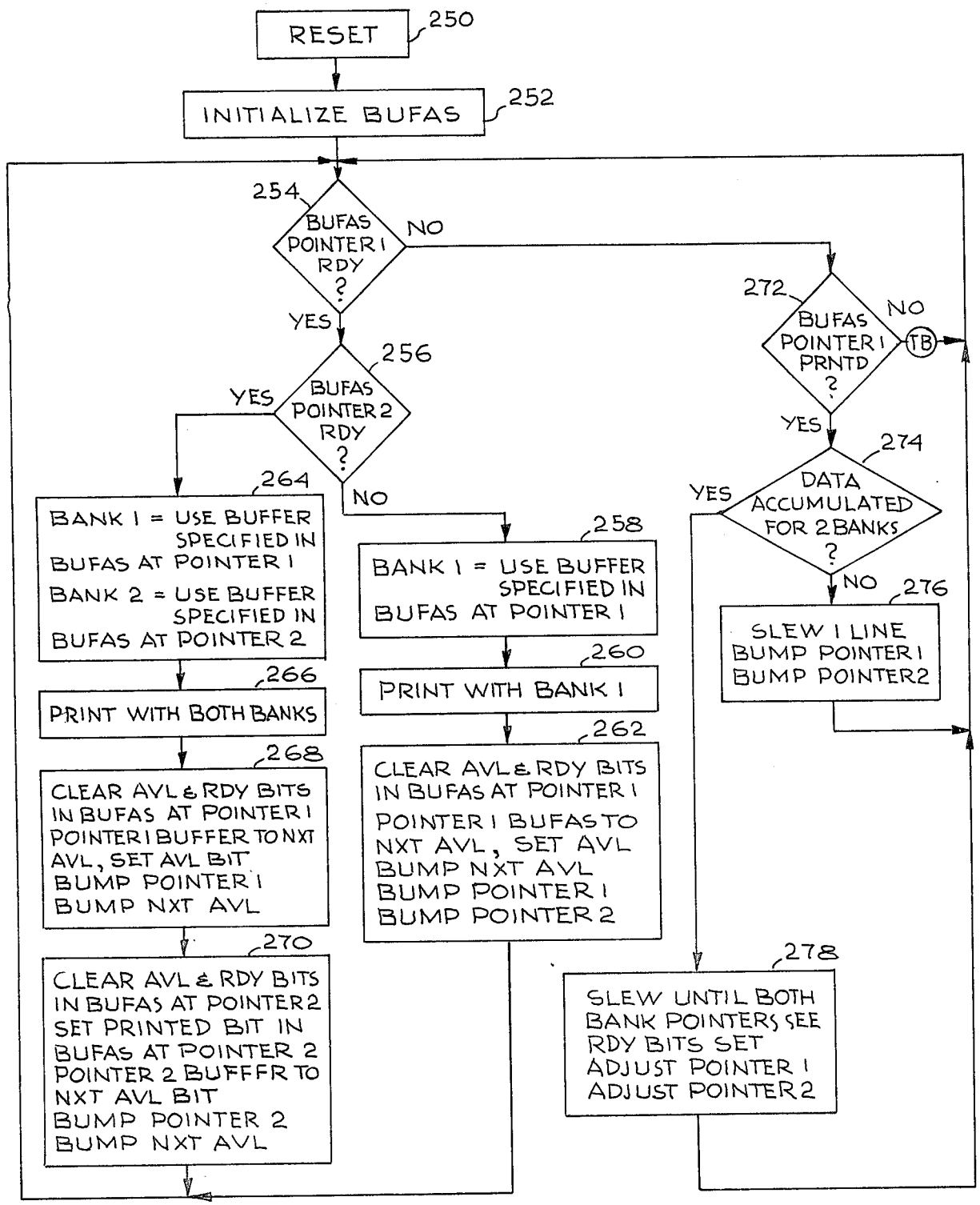
FIGS. 9A and 9B are flow charts respectively depicting the buffer assignment sequence of the print control microprocessor when both banks are enabled and when only one bank is enabled.
Figure 9B:
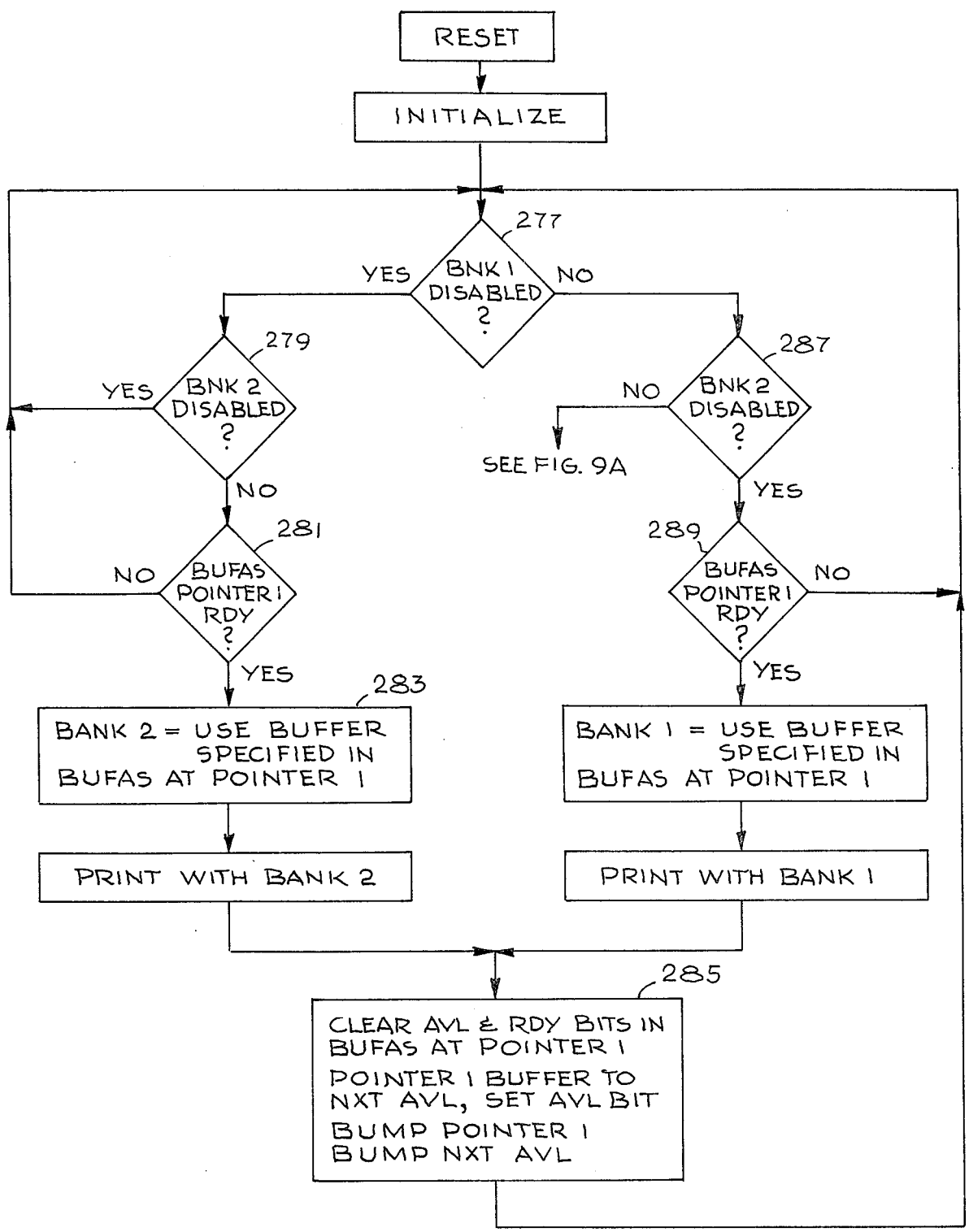
Figure 9C:
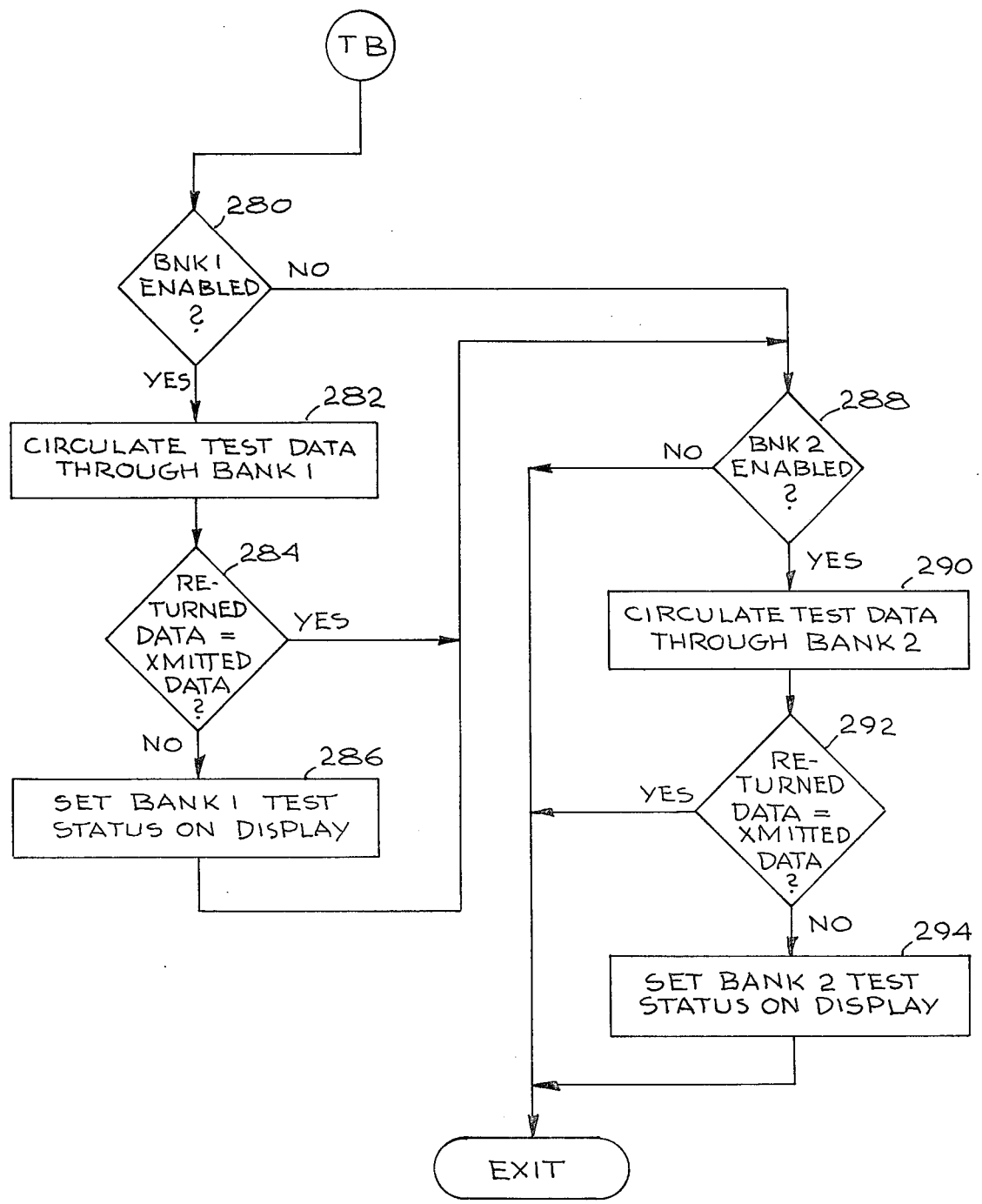
FIG. 9C is a further flow chart depicting the test bank sequence of the print control microprocessor.

Attention is now directed to FIG. 9A which comprises a flow chart depicting the buffer assignment sequence for the print control processor Z82. FIG. 9A assumes that both hammer banks are enabled. The flow chart is initiated from a reset state designated by block 250. Thereafter, flow proceeds to an initialize operation depicted by block 252. As aforementioned, the initialize bufas operation involves assigning each of the seven line buffer numbers to the first seven bufas locations 0 through 6. The available control bits are set in each of these seven bufas locations and the Z82 pointers are set with pointer 1 pointing at bufas location 0, pointer 2 pointing at bufas location 3, and the next available pointer pointing at bufas location 7. The Z81 pointer is pointing at bufas location 0.

After the initialize operation 252 is completed, flow proceeds to decision block 254 which asks is pointer 1 pointing to a bufas location having a set ready bit. This decision block really asks has the I/O processor Z81 filled the line buffers associated with bufas location 0 with data and set the ready bit. If the answer is yes, flow proceeds to decision block 256 which asks if the bufas location pointed to by pointer 2 contains a set ready bit. In what may be considered the simplest case, the answer would be no meaning that there is one line ready to be printed by hammer bank 1 but there is not a ready line in the line buffers to be printed by hammer bank 2. This occurs if the I/O processor Z81 has not accumulated enough data to fill the line buffers down past where pointer 2 is pointing. In a real time situation it says that we have enough data to print with one bank but not with both. In this situation, after decision block 256, the flow moves to block 258 in which the line data in the buffer specified by the bufas location designated by pointer 1 is transferred to hammer bank 1 with hammer bank 1 then printing that line as represented by block 260. After the line is printed, flow proceeds to block 262 in which processor Z82 clears the available and ready bits in the bufas location designated by pointer 1. The buffer number designated in the bufas location designated by pointer 1 is then transferred to the bufas location designated by the next available pointer and the available control bit therein is set. Additionally, all of the Z82 pointers are the bumped (i.e. incremented by one). After block 262, operation loops back to decision block 254. Operation can continue indefinitely in this small loop if the I/O processor Z81 does not accumulate enough lines of data in the line buffers to enable operation with both hammer banks.

On the other hand, now consider the situation in which the decision out of decision block 256 is yes, meaning that there is now enough lines in the line buffers to enable both hammer banks to print. Continuing with the assumption that printing is at six lines per inch, this situation will occur if at least four line buffers are full.

Accordingly, if the answer is yes out of decision block 256, block 264 will be executed. The operational step represented by block 264 calls for bank 1 to use the line buffer specified in the bufas location designated by pointer 1 and for bank 2 to use the line buffer specified in the bufas location designed by pointer 2. Flow proceeds from block 264 to block 266 in which printing occurs in both banks.

Flow proceeds from block 266 to block 268 in which the available and ready bits in the bufas location designated by pointer 1 are cleared. Additionally, the line buffer number specified in the bufas location designated by pointer 1 is transferred to the bufas location designated by the next available pointer and the available control bit is set therein. Thereafter, pointer 1 and the next available pointer are bumped. Flow then proceeds to block 270 in which the available and ready bits in the bufas location designated by pointer 2 are cleared. Additionally, the printed bit in that bufas location designated by pointer 2 is set. The line buffer number in the bufas location designated by pointer 2 is transferred to the bufas location designated by the next available pointer and the available bit is set therein. Pointer 2 and the next available pointer are then bumped and flow loops back to decision block 254.

From what has been said thus far in connection with FIG. 9A, it should be appreciated that when there is sufficient data in the line buffers to enable both banks to be printing simultaneously, flow will proceed through blocks 254, 256, 264, 266, 268, and 270. On the other hand, when there is only data in the line buffer sufficient to enable one bak to be printing, flow will proceed through blocks 254, 256, 258, 260, and 262.

Now consider the situation in which decision block 254 results in a negative response leading flow to decision block 272 which asks is the printed bit within the bufas location designated by pointer 1 set. It will be set only if the character line associated with the bufas location designated by pointer 1 has already been printed by hammer bank 2. That is it will be recalled from the aforediscussed Table that in normal operation when both hammer banks are operating simultaneously, hammer bank 1 is operating on line 1 and, hammer bank 2 is operating on line 4. When the line buffer number storing the line 4 character data moves up to pointer 1 (consider FIG. 8), it is the set printed bit within the bufas that indicates that the associated character line has already been printed. Assuming this case, the flow will proceed from decision block 272 to decision block 274 which asks is there sufficient data accumulated for both banks to be printing. This is determined by the print control processor Z82 interrogating the printer and ready control bits in the bufas locations in the proper sequence. If the answer is no flow proceeds to block 276 in which the paper is slewed one line and pointers 1 and 2 are bumped. Exiting from block 276, flow proceeds back to decision block 254.

Now consider the situation when the result of the question raised by decision block 274 is yes. That is, an interrogation of the printed and ready bits determines that there is sufficient data in the line buffers to print with both banks. Consequently, flow will proceed to block 278 which causes the paper to be slewed and the pointers to be bumped until both pointers 1 and 2 see ready bits in the bufas locations they designate. Thus, in a typical situation where hammer bank 1 prints line 1, 2 and 3 while hammer bank 2 concurrently prints lines 4, 5 and 6, it is then necessary to slew the paper three lines in order to move printed line 6 up past hammer bank 1. This is accomplished in block 278 which indicates that the pointers are adjusted, i.e. bumped for each line that the paper is slewed. Thus, it should now be appreciated that FIG. 9A describes the technique by which incoming character lines to be printed are assigned to physical hammer banks with the print control processor Z82 continually making a decision as to whether to print with one or two banks, depending upon the amount of data ready in the line buffers. It should be appreciated that the printer will print with both banks whenever there is sufficient line data ready to supply both banks.

It will be recalled that the operations represented by the flow chart of FIG. 9A assume that neither of the banks is disabled, as indicated by the bank disabled switches 63 (FIG. 3). The print control processor Z82 operates to determine whether either of the banks is disabled prior to executing the flow chart of FIG. 9A. Attention is now directed to the flow chart of FIG. 9B which describes the buffer assignment sequence for the print control processor Z82 if either one or both of the hammer banks has been disabled. Thus, the first decision block 277 queries whether bank 1 is disabled. If bank 1 is disabled, flow proceeds to decision block 279 which queries whether bank 2 is disabled. If the answer is yes, flow returns to decision block 277. If the answer is no, flow proceeds to decision block 281 which determines whether bufas pointer 1 is ready. If no, then flow returns to decision block 277. If yes, then flow proceeds to block 283 in which bank 2 uses the buffer specified in the buffer assignment location pointed to by pointer 1. Thereafter, printing occurs with bank 2 leading to block 285 in which the available and ready bits are cleared from the buffer assignment location pointed to by pointer 1. The pointer 1 buffer number is moved to the next available buffer assignment location and the available bit is set therein. The next available pointer and pointer 1 are then bumped. Flow returns from block 285 to decision block 277.

If decision block 277 resulted in a negative response, then flow proceeded to decision block 287 which asked is bank 2 disabled. If the answer is negative, then flow would have proceeded to FIG. 9A meaning that both banks are operable. On the other hand, if the decision out of decision block 287 is yes, flow proceeds to decision block 289 which determines whether the bufas pointer 1 is ready. If no, returns to decision block 277. If yes, then the buffer specified in the buffer assignment location designated by pointer 1 is used to produce dot data bits for bank 1 and bank 1 is then printed. Thereafter, flow proceeds to block 285 which has already been described.

Returning to FIG. 9A for a moment, it will be recalled that if the decision as a consequence of decision block 272 was negative, the system proceeded to a test bank subroutine identified by the circle enclosing the letters TB. The test bank routine is depicted in the flow chart of FIG. 9C. The print control processor Z82 will periodically execute the test bank routine to determine the operability of the banks. If a bank is found to be disabled, as determined by it feeding back a pattern different from the test pattern supplied to it, then the operator is alerted that one of the banks is faulty and the bank can be disabled using switches 63 to permit the printer thereafter to operate utilizing the remaining bank(s).

The test bank routine includes decision block 280 which queries, is bank 1 enabled? This is determined by examining the enable/disable switch 63 for bank 1. If the response is yes, then the print control processor Z82 supplies, from the mapper, a series of bits to the shift register 44 of bank 1, as represented by block 282. The data returned from the shift register 44 to the mapper 70 is compared with the transmitted test data in decision block 284. If it does not match, then flow proceeds to block 286 which sets an appropriate status light on the operator display. After block 286 or if decision block 284 resulted in a yes decision, flow proceeds to decision block 288. Note also that if bank 1 were disabled, flow would have proceeded to decision block 288 directly from decision block 280. In decision block 288 if bank 2 is enabled as represented by its enable/disable switch, flow proceeds to block 290 which supplies a test pattern to shift register 44 of hammer bank 2. Flow out of block 290 is to decision block 292 which represents the determination of whether the test data transmitted to shift register 44 matches the data fed back therefrom. If the data matches, then flow proceeds directly from block 292 to the routine exit. If on the other hand the data does not match, then block 294 occurs setting an appropriate status bit on the operator display to indicate that bank 2 is inoperable.

Figure 10:
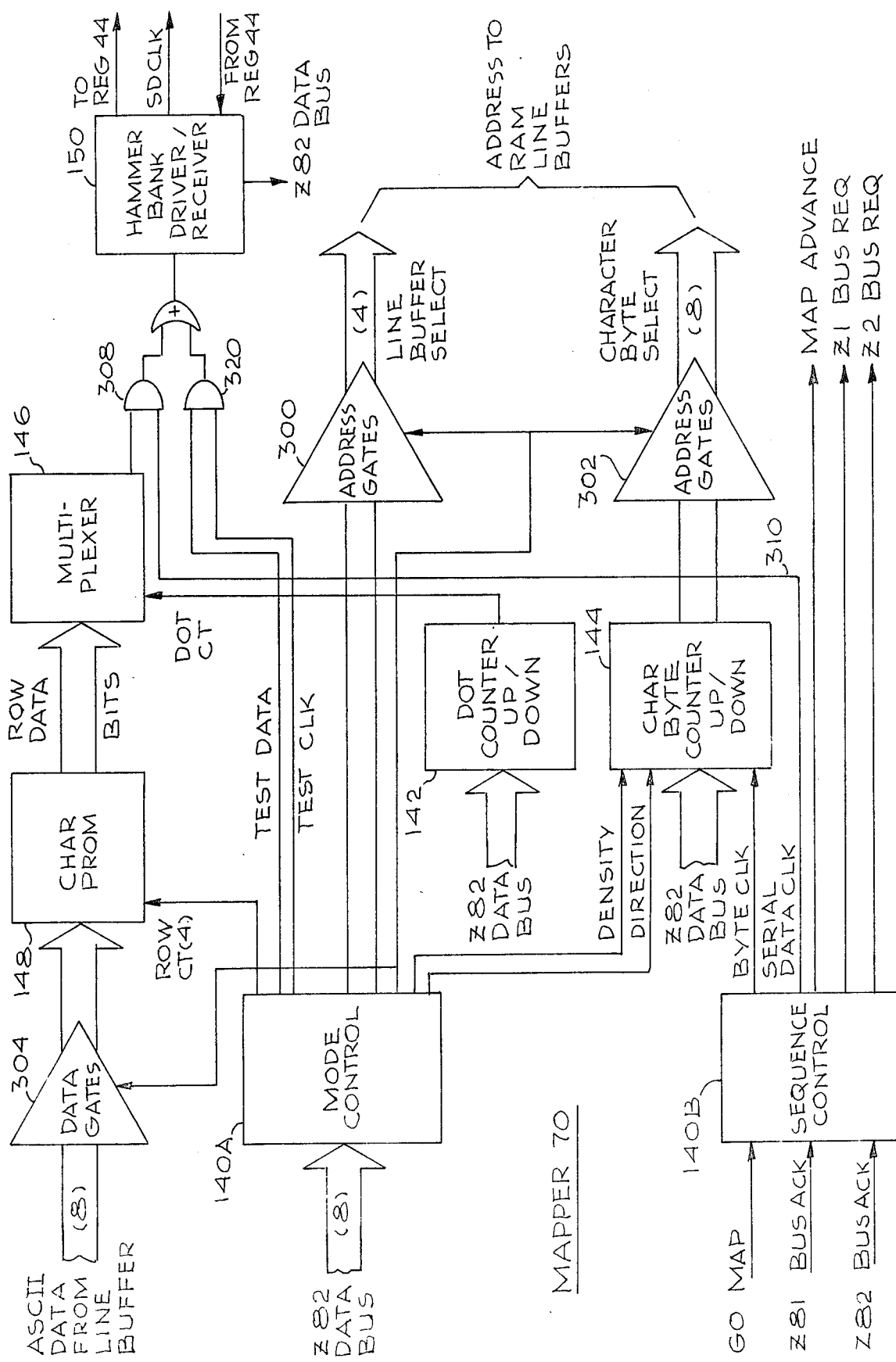
FIG. 10 is a block diagram of the mapper subsystem depicted in FIG. 4.
Figure 11:
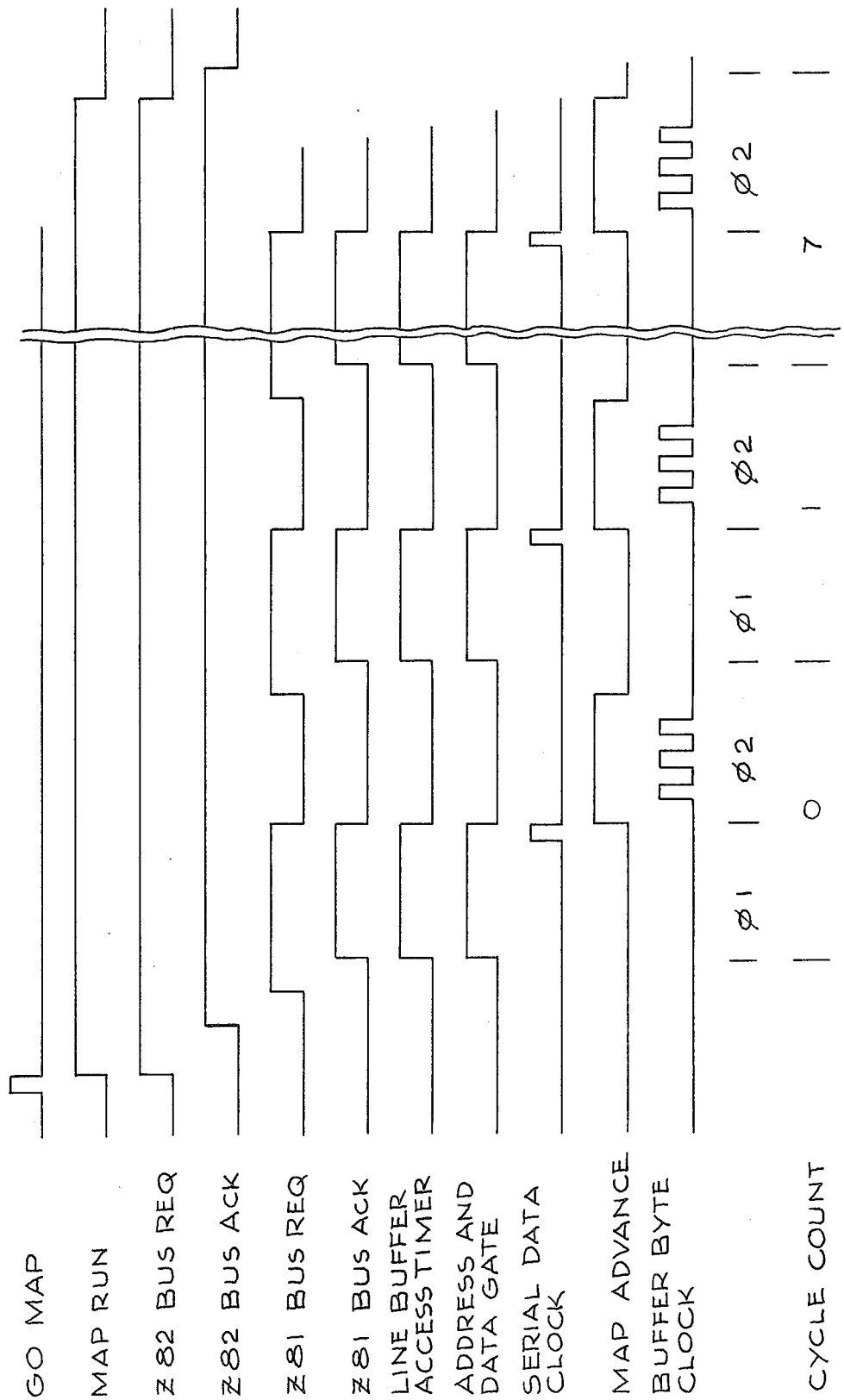
FIG. 11 is a timing chart generally depicting the operation of the mapper subsystem of FIG. 10.

Attention is now directed to FIG. 10 which comprises a more detailed block diagram of the mapper 70 of FIG. 4 and to FIG. 11 which comprises a timing chart to facilitate an understanding of the operation of the mapper of FIG. 10. From what has been previously said, it should be understood that the function of the mapper 70 is to access character bytes in the correct sequence from the appropriate line buffers as the hammer banks sweep along their respective print rows and to derive from each character byte a single dot data bit appropriate to the dot row and dot column positions of the respective hammer banks. The mapper 70 is under the control of the print control processor Z82 which initiates the mapper operation by loading data into the mode control unit 140A describing the operational mode, e.g. character density and direction of hammer bank movement. Additionally, the control processor Z82 via its data bus identifies to address gates 300 the line buffer from which character bytes are to be accessed. Additionally, the processor Z82 data bus initially loads the character byte counter 144 identifying the starting byte of the 256 bytes in the selected line buffer. Further, the processor Z82 data bus loads the dot counter 142 to identify the starting dot column.

After the processor Z82 loads the mode control unit 140A, the dot counter 142, and the character byte counter 144, it issues a go map command to the sequence control unit 140B which initiates a map run state as depicted in FIG. 11. The sequence control unit 140B responds to the go map command by issuing a bus request to the processor Z82, essentially advising the processor Z82 that it wants to take charge of the Z82 data bus. The processor Z82 will then typically respond with a Z82 bus acknowledge input to the sequence control unit 140B and the address bus and data bus associated with processor Z82 then effectively become under the control of the mapper 70. The sequence control unit 140B then issues a bus request to processor Z81 because it needs to get access to the line buffers in the memory 66 which are under the control of processor Z81. The processor Z81 will typically respond with a Z81 bus acknowledge signal applied to the sequence control unit 140B and depicted in FIG. 11. At this point, the mapper begins an eight cycle sequence, with each cycle being comprised of two phases. During the first phase of each cycle, the addressed line buffer is accessed at the byte location defined by the character counter 144 and applied to address gates 302, to bring the coded character byte via the Z82 data bus to the data gates 304. The eight bit coded byte is applied to the character PROM 148 which, together with row count information supplied by the mode control unit 140A outputs multiple dot data bits representing a dot row of the particular character. That row of data bits is applied to multiplexer 146 and a single bit is selected therefrom depending upon the count in dot counter 142. The single dot selected from the row of dots is applied by multiplexer 146 to gate 308 which is enabled by a serial data clock pulse train on terminal 310 supplied by sequence control unit 140B.

After the sequence control unit generates each serial data clock pulse, a map advance signal is supplied by the sequence control unit 140B initiating phase 2. During the map advance state, the bus request to processor Z81 is removed thus giving the data bus back to processor Z81 which is free to then carry on its task, e.g. loading the memory 66. During the map advance state the character byte counter 144 is moved to the next required character byte position in the line buffer. The next character byte position can of course be either up or down depending upon the then direction of movement of the hammer bank being serviced. On the assumption that the printer is operating in the normal density mode in which each of the forty four hammers sweeps the field of three characters, the byte counter will be incremented or decremented by a count of three. That is, if hammer 1 for example is operating on character 1, then hammer 2 should be concurrently operating on character 4. If a density mode other than normal density is defined by the mode control unit 140A, then the byte counter 144 can be stepped by four or five counts instead of three counts.

At the end of phase 2, the byte counter 144 is now defining the next character byte in the line buffer to be accessed. As a consequence, the mapper switches back to phase 1, performing another bus request to the processor Z81 and awaiting a Z81 bus acknowledge signal before accessing the line buffer to develop the next single dot data bit.

The sequence control unit 140B counts up to eight cycles, each comprised of phase 1 and phase 2 and during these eight cycles develop eight dot data bits which are held by the hammer bank driver receiver 150. After the first eight dot data bits are accumulated, the mapper will drop its bus request to processor Z82 and Z82 will remove the bus acknowledge signal thereby returning the data bus and address bus to processor Z82. Z82 then will operate in accordance with its control PROM 116 which in most circumstances will then generate a further go map command to again initiate operation of the mapper 70.

Processor Z82 and the mapper 70 combine to interact in this fashion through six operations, each go map command resulting in eight bits of data being accumulated by the hammer bank driver receiver 150 and being sent as serial data to shift register 44 and the hammer bank being operated upon. The six discreet operations of the mapper 70 generate forty eight bits, four of which are not used, and the other forty four bits supplying one dot data bit for each hammer. In between successive mapper operations, processor Z82 does not need to set up the mapper any further than the initial set up because the mapper 70 retains it status and is able to pick up where it left off. Its only in connection with the first go map operation that processor Z82 must input to the mode control unit 140A. After the six go map operations, the shift register 44 on the hammer bank will be fully loaded with data which is then utilized at the next hammer fire pulse.

It will be recalled from the prior discussion that the hammer banks are updated sequentially. Processor Z82 controls the hammer bank updates as represented in the timing chart of FIG. 5A to cause both hammer banks to be updated between hammer fire pulses.

More particularly, when a row of data is to be printed, a time zero is defined by processor Z82 and two channels of timing are started simultaneously by the counter timer circuit 74. One channel generates the timing to increment the shuttle stepper motor which causes the shuttle to accelerate up to speed, then travel at a substantially constant speed and then slow down and stop as depicted in FIG. 5A. Simultaneously, a second channel in the counter timer circuit 74 generates a series of hammer fire pulses that fire the hammers on both banks simultaneously. The process of updating the hammer banks occurs between successive hammer fire pulses. Processor Z82 controls this sequence, causing the generation of the shuttle step and hammer fire pulses and noticing when they occur in order to generate updated data for the hammer banks. Typically, each hammer fire pulse will set a hammer fired flip flop (line (b) of FIG. 5B) and processor Z82 will sense the state of this flip flop.

Prior to concluding the description of FIG. 10, it is also pointed out that the mode control unit 140A has two output terminals identified as test data and test clock. It will be recalled from the explanation of the test bank flow chart of FIG. 9B that the test bank routine occurs periodically. In executing the test bank routine, processor Z82 will cause the mode control unit 140A to output a test data pattern to gate 320. The hammer bank driver receiver 150 will in turn supply that bit sequence to register 44 of the designated hammer bank and will monitor the bit sequence returned from that same register 44 and output it to the Z82 data bus which then compares the received sequence with the test sequence to determine whether they match.

What is claimed is:

1. A matrix line printer including means for moving a paper web along a defined path, first and second hammer banks each comprised of N individually actuatable dot hammers respectively aligned along first and second print rows extending substantially perpendicular to the direction of movement of said web along said path, a motor coupled to said first and second banks for moving said banks along said print rows, to sweep each hammer across C character positions wherein each character position defines D dot positions, and a control system responsive to externally supplied data defining character lines to be printed for controlling said hammers, said control system comprising:

read/write memory means including multiple line buffers;

a first processor means coupled to said memory means and including means responsive to said externally supplied data for successively storing sets of N×C character bytes in said line buffers, each set defining one character line to be printed and each being stored in a different one of said multiple line buffers;

a second processor means coupled to said memory means and including means for selecting a sequence for reading from said multiple line buffers and a sequence for reading character bytes from each selected line buffer;

first and second registers, each capable of storing N dot data bits, respectively coupled to said first and second hammer banks; and mapper means responsive to each character byte selected to be read by said second processor means for supplying a single dot data bit to one of said registers for each of $C \times D$ positions of the hammer bank coupled thereto during its movement along its print row.

2. The printer of claim 1 wherein said motor coupled to said first and second banks comprises a stepper motor; and further including:

first timer means for supplying pulses to said stepper motor to step said hammer banks along their respective print rows; and wherein said second processor controls the time interval between pulses supplied by said first timer means.

3. The printer of claim 2 including second timer means for supplying $C \times D$ hammer fire pulses to said hammer banks during each pass of said banks along their respective print rows; and wherein said second processor controls the time interval between pulses supplied by said second timer means.

4. The printer of claim 1 wherein said memory means includes a plurality of line buffer assignment locations; said second processor including means for assigning each line buffer to a different assignment location and for indicating therein that the assigned line buffer is available for storing a set of character bytes;

said first processor including means for storing each set of character bytes in an available line buffer and for indicating in the assignment location to which that line buffer is assigned that the line buffer is ready for printing; and wherein said means for selecting a sequence for reading from said line buffers is responsive to said ready indications.

5. The printer of claim 4 wherein said second processor further includes means for reassigning each line buffer to a different assignment location after it has been selected for reading.

6. The printer of claim 1 including means for supplying a test bit pattern to each of said registers and means for reading the register to which the test bit pattern was supplied to determine whether it was correctly stored therein.

7. The printer of claim 1 including disabling means for selectively disabling said first and/or second hammer banks; and wherein said second processor means is responsive to said disabling means for directing said dot data bits supplied by said mapper means to a register coupled to a bank which is not disabled.

* * * * *